(12) United States Patent
Zhang

(10) Patent No.: US 7,379,590 B2
(45) Date of Patent: May 27, 2008

(54) METHOD FOR GENERATING NATURAL COLOUR SATELLITE IMAGES

(75) Inventor: Yun Zhang, Fredericton (CA)

(73) Assignee: University of New Brunswick, Fredericton, New Brunswick (CA)

( * ) Notice: Subject to any disclaimer, the term of this patent is extended or adjusted under 35 U.S.C. 154(b) by 642 days.

(21) Appl. No.: 10/756,781

(22) Filed: Jan. 14, 2004

(65) Prior Publication Data

US 2005/0089219 A1    Apr. 28, 2005

Related U.S. Application Data

(60) Provisional application No. 60/440,636, filed on Jan. 17, 2003.

(51) Int. Cl.
G06K 9/00 (2006.01)
G06K 9/40 (2006.01)

(52) U.S. Cl. .................. 382/167; 382/274; 382/110

(58) Field of Classification Search ............... 382/167, 382/274
See application file for complete search history.

(56) References Cited

U.S. PATENT DOCUMENTS

| | | | | |
|---|---|---|---|---|
| 4,418,359 A * | 11/1983 | Stapleton | .................. | 348/809 |
| 4,688,085 A * | 8/1987 | Imaide | .................. | 348/237 |
| 4,864,127 A * | 9/1989 | Brame | .................. | 250/253 |
| 5,467,145 A * | 11/1995 | Limberg | .................. | 348/628 |
| 5,479,255 A * | 12/1995 | Denny et al. | .................. | 356/319 |
| 5,555,464 A * | 9/1996 | Hatlestad | .................. | 348/266 |
| 5,661,817 A * | 8/1997 | Hatlestad et al. | .................. | 382/110 |
| 5,949,914 A * | 9/1999 | Yuen | .................. | 382/254 |
| 5,991,456 A * | 11/1999 | Rahman et al. | .................. | 382/254 |
| 6,141,441 A * | 10/2000 | Cass et al. | .................. | 382/166 |
| 6,160,902 A * | 12/2000 | Dickson et al. | .................. | 382/110 |
| 6,178,253 B1 * | 1/2001 | Hendrickson et al. | .................. | 382/110 |
| 6,212,824 B1 * | 4/2001 | Orr et al. | .................. | 47/58.1 R |
| 6,304,682 B1 | 10/2001 | Patti | | |
| 6,356,646 B1 * | 3/2002 | Spencer | .................. | 382/103 |
| 6,366,681 B1 * | 4/2002 | Hutchins | .................. | 382/110 |
| 6,417,891 B1 * | 7/2002 | Cacciatore et al. | .................. | 248/649 |
| 7,095,420 B2 * | 8/2006 | Burky et al. | .................. | 345/589 |
| 2004/0075667 A1 * | 4/2004 | Burky et al. | .................. | 345/589 |

OTHER PUBLICATIONS

Parker J.R., Algorithms for Image Processing and Computer Vision, John Wiley & Sons, New York, Chichester 1997.

* cited by examiner

Primary Examiner—Jingge Wu
Assistant Examiner—Max Shikhman
(74) Attorney, Agent, or Firm—Eugene F. Derenyi

(57) ABSTRACT

A simple and effective method is disclosed in the present invention to adjust the near natural colour of a satellite color composite to a visually more pleasing natural colour. This method includes two steps: (1) extracting vegetation "greenness" from available multispectral bands, and (2) adding (injecting) the "greenness" into the vegetation areas of the green band being displayed.

9 Claims, 2 Drawing Sheets

METHOD FOR GENERATING NATURAL COLOUR SATELLITE IMAGES

CROSS REFERENCE TO RELATED APPLICATIONS

This application claims priority from U.S. Provisional Patent application Ser. No. 60/440,636 filed Jan. 17, 2003.

FIELD OF THE INVENTION

This invention relates to the field of image processing and in particular a method of generating natural colour satellite images.

BACKGROUND OF THE INVENTION

Generally, the blue, green and red bands of multispectral satellite sensors do not cover the whole blue, green and red wavelength ranges, respectively. As a result, the "natural" colour composites from the blue, green and red bands do not reproduce natural colours as found in the nature or on a colour photo. Such colour is near natural colour, but still noticeably unnatural. In order to achieve a better visual effect, it is useful to adjust, either manually or automatically, the near natural colour to a more natural colour. Such a colour adjustment is useful in many applications, such as colour image mapping, GIS integration, image visualization, and other purposes.

The most representative ground covers on the Earth's surface are vegetation, water and soil (e.g., surface not covered by vegetation or water). Their general spectral reflectance in different spectral ranges is characterized in FIG. 1. Vegetation curves have a peak in the green range compared to the blue and red ranges. The spectral curves of soil reflectance rise proportional to the wavelength. However, the curve of clear water usually has a peak in blue range and then descends proportional to the wavelength. Therefore, when the blue, green and red bands of a multispectral sensor are displayed with blue, green and red colour, a near natural colour composite can be generated with water shown in blue, vegetation shown in green and soil shown in light yellow grey or light red grey). But, the colour of vegetation often does not show up as a natural green. This makes colour composites look unnatural and not visually pleasing.

SUMMARY OF THE INVENTION

The invention relates to a method for generating a natural colour image comprising the steps of generating a greenness band from a multispectral image including blue, green, red and near infrared bands and adjusting the green band using the greenness band.

In another embodiment, the invention relates to a method for generating a pan-sharpened natural colour image comprising the steps of generating a greenness band from pan-sharpened image bands including blue, green, red and near infrared bands and adjusting the pan-sharpened green band using the greenness band.

In another embodiment, the invention relates to a method for generating a pan-sharpened natural colour image comprising the steps of generating a greenness band from a panchromatic image and a pan-sharpened red band; and adjusting the pan-sharpened green band using the greenness band.

TECHNICAL DESCRIPTION OF THE INVENTION

A simple and effective method is disclosed in the present invention to adjust the near natural colour of a satellite colour composite to a visually more pleasing natural colour. This method includes two steps: (1) extracting vegetation "greenness" from available multispectral bands, and (2) adding (injecting) the "greenness" into the vegetation areas of the green band being displayed. In this way the vegetation areas can be made to look greener and fresher, so that the whole image appears more natural. This method can be used to adjust the near natural colour of original multispectral composites and that of pan-sharpened composites.

Adjusting the Colour of Original Near Natural Colour Composites

For a near natural colour composite with original multispectral bands, the vegetation "greenness" can be extracted using the equation:

$$GN = (NIR_{Orig} - R_{Orig} - \lambda)/s \qquad (1)$$

where GN is a greenness band, $NIR_{Orig}$ is an original near infrared band, $R_{Orig}$ is an original red band, $\lambda$ is a threshold and s is a scale factor.

Figure 1:
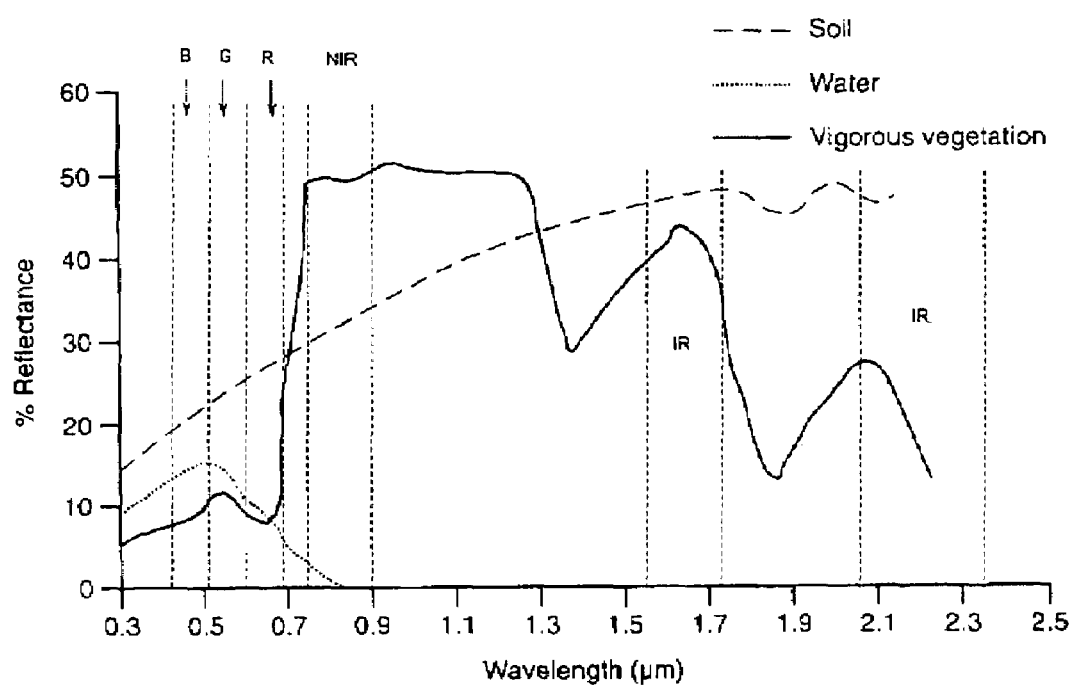
FIG. 1 is a graph showing general spectral reflectance curves of soil, water and vegetation with general spectral ranges of individual multispectral bands.

From FIG. 1 it can be seen that the vegetation reflectance is very high in near infrared range and very low in red range. Consequently, vegetation covers have very high grey values in near infrared (NIR) band and low grey values in red (R) band. The subtraction of NIR band by R band ($NIR_{Orig} - R_{Orig}$) results in a subtraction band with high grey values in vegetation areas (because of large grey value difference between the NIR and R bands), low grey values in soil areas, and negative grey values in water areas. To make sure that the colour adjustment just happens to vegetation areas, a threshold $\lambda$ needs to be introduced to segment non-vegetation areas in the subtraction band from vegetation areas, and then the non-vegetation areas need to be assigned with a grey value of zero. After this segmentation and assignment, only vegetation areas in the subtraction band contain grey values larger than zero, while other areas are all set to zero, resulting in a greenness band. The threshold can be identified manually and automatically. Some segmentation methods can be adopted for the segmentation, for example, the methods introduced by Parker J. R. (1997) [Algorithms for Image Processing and Computer Vision, John Wiley & Sons, New York, Chichester, 417 p.]. To control the magnitude of the greenness, a scale factor s can be introduced.

Alternative methods can be used to generate the greenness band. Instead of using the original red band ($R_{Orig}$), the original green or blue band can be used to replace the red band ($R_{Orig}$) in equation (1). This replacement also can results in a greenness band with high grey values in vegetation areas and zero grey value in other areas.

After the greenness band is generated, the greenness can be added (or injected) into the vegetation areas of the green band to adjust the green colour of the near natural colour composite:

$$G_{Adj}=G_{Orig.}+GN \quad (2)$$

where $G_{Adj}$ is an adjusted green band, $G_{Orig}$ is an original green band and GN is a greenness band.

For the improved natural colour image display, original blue band, adjusted green band, and original red band are displayed with blue, green and red colour, respectively.

Adjusting the Colour of Pan-Sharpened Near Natural Colour Composites

A similar method can be applied to improve the natural colour display of pan-sharpened colour composites. However, pan-sharpened near infrared need to be used to generate a high resolution greenness band:

$$GN_H=(NIR_{PS}-R_{PS}-\lambda)/s \quad (3)$$

where $GN_H$ is a high resolution greenness band, $NIR_{PS}$ is a pan-sharpened near infrared band, $R_{PS}$ is a pan-sharpened red band, $\lambda$ is a threshold and s is a scale factor.

An alternative for generating a high resolution greenness band is, instead of using pan-sharpened near infrared band, the high resolution panchromatic band can be used. This alternative also results in very good results. The method for extracting the high resolution greenness can be described as:

$$GN_H=(Pan_{Orig}-R_{PS}-\lambda)/s \quad (4)$$

where $GN_H$ is a high resolution greenness band, $Pan_{Orig}$ is an original panchromatic band, $R_{PS}$ for pan-sharpened red band, $\lambda$ is a threshold and s is a scale factor.

Figure 2:
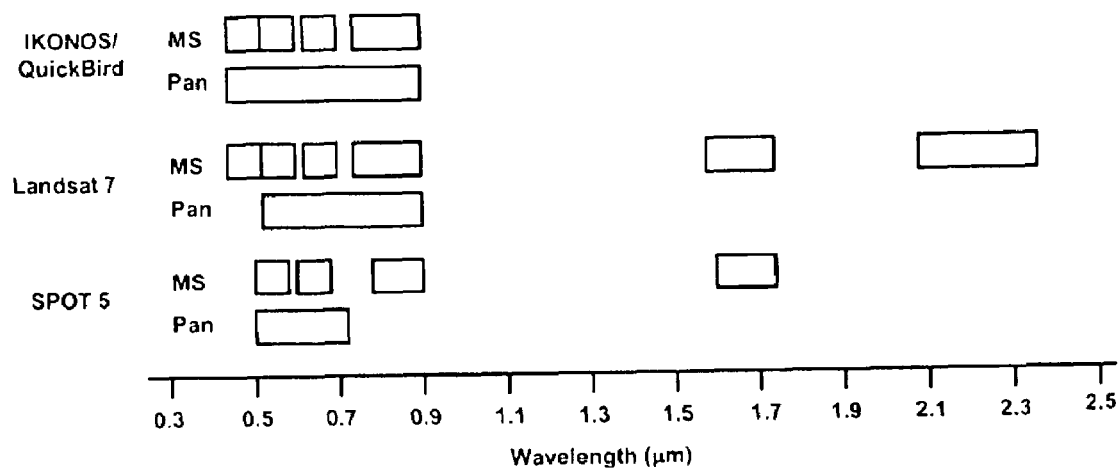
FIG. 2 is a diagram showing spectral ranges of the multispectral bands and panchromatic band from individual satellites.

From FIG. 2 it can be seen that the panchromatic bands of IKONOS, QuickBird and Landsat 7 cover a broad spectral range including near infrared. The average spectral reflectance of vegetation for this broad range is not as high as in near infrared range, but it is still significantly higher than the average reflectance of soil and water for the same range (see FIG. 1). Therefore, vegetation is usually brighter than soil and water in such panchromatic images. The subtraction of $Pan_{Orig}$ band by $R_{PS}$ band ($Pan_{Orig}-R_{PS}$) results in high grey values in vegetation areas, very low grey values in soil areas and water areas. A threshold $\lambda$ is also needed to segment non-vegetation areas from vegetation areas to set the grey values of non-vegetation areas to zero. After this segmentation, only vegetation areas of the subtraction band contain grey values higher than zero, while other areas are zero, resulting in a high resolution greenness band ($GN_H$). A scale factor s can be introduced to adjust the magnitude of the greenness.

Other variations for generating greenness bands or high-resolution greenness bands exist. For example, subtraction of near infrared band by green band or blue band and subtraction of green band by blue or red band can also generate greenness bands. For high resolution greenness bands, pan-sharpened bands need to be involved. The subtraction of original panchromatic band by pan-sharpened green or blue band can also result in a high resolution greenness band. However, the greenness bands generated with equations (1) (3) or (4) are more effective for improving the natural colour visualization of multispectral satellite images.

After the high resolution greenness band is generated, the greenness can be added (or injected) into the vegetation areas of the pan-sharpened green band to adjust the green colour of the pan-sharpened near natural colour composite:

$$G_{HAdj}=G_{PS}+GN_H \quad (5)$$

where $G_{HAdj}$ is an adjusted high resolution green band, $G_{PS}$ is a pan-sharpened green band and $GN_H$ is a high resolution greenness band.

For the display of the improved natural colour image, pan-sharpened blue band, adjusted high resolution green band, and pan-sharpened red band are displayed with blue, green and red colour, respectively.

In a preferred embodiment of the invention, the methods of the present invention are implemented by a programmed computer, and the method is used as a computer program product comprising a software tool stored on a machine-readable medium such as a CD Rom or floppy disc.

I claim:

1. A method for improving the colour of a natural colour image comprising the steps of:
    generating a greenness band from a multispectral image including blue, green, red and near infrared bands and adjusting the green band using the greenness band,
    wherein the greenness band is generated mathematically using the equation:

$$GN=(NIR_{Orig}-R_{Orig}-\lambda)/s$$

where GN is a greenness band, $NIR_{Orig}$ is an original near infrared band, $R_{Orig}$ is an original red band, $\lambda$ is a threshold and s is a scale factor.

2. A method for improving the colour of a natural colour image comprising the steps of:
    generating a greenness band from a multispectral image including blue, green, red and near infrared bands and adjusting the green band using the greenness band,
    wherein the green band is adjusted mathematically using the equation:

$$G_{Adj}=G_{Orig}+GN$$

where $G_{Adj}$ is an adjusted green band, $G_{Orig}$ is an original green band and GN is a greenness band.

3. The method for improving the colour of a pan-sharpened natural colour image comprising the steps of
    generating a greenness band from pan-sharpened image bands including blue, green, red and near infrared bands and
    adjusting the pan-sharpened green band using the greenness band,
    wherein the greenness band is mathematically generated using the equation:

$$GN_H=(NIR_{PS}-R_{PS}-\lambda)/s$$

where $GN_H$ is a high resolution greenness band, $NIR_{PS}$ is a pan-sharpened near infrared band, $R_{PS}$ is a pan-sharpened red band, $\lambda$ is a threshold and s is a scale factor.

4. The method for improving the colour of a pan-sharpened natural colour image comprising the steps of
    generating a greenness band from a panchromatic image and a pan-sharpened red band; and
    adjusting the pan-sharpened green band using the greenness band,
    wherein the greenness band is mathematically generated using the equation:

$$GN_H=(Pan_{Orig}-R_{PS}-\lambda)/s$$

where $GN_H$ is a high resolution greenness band, $Pan_{Orig}$ is an original panchromatic band, $R_{PS}$ for pan-sharpened red band, $\lambda$ is a threshold and s is a scale factor.

5. The method for improving the colour of a pan-sharpened natural colour image comprising the steps of generating a greenness band from pan-sharpened image bands including blue, green, red and near infrared bands and adjusting the pan-sharpened green band using the greenness band, wherein the pan-sharpened green band is adjusted mathematically using the equation:

$$G_{HAdj} = G_{PS} + GN_H$$

where $G_{HAdj}$ is an adjusted pan-sharpened green band, $G_{PS}$ is an pan-sharpened green band and $GN_H$ is a high resolution greenness band.

6. A method for improving the colour of a natural colour image comprising the steps of generating a greenness band from a multispectral image including blue, green, red and near infrared bands and adjusting the green band using the greenness band, wherein the greenness band is generated using an equation selected from the group comprising equations:

$$GN = (NIR_{Orig} - G_{Orig} - \lambda)/s \text{ and}$$

$$GN = (NIR_{Orig} - B_{Orig} - \lambda)/s,$$

where GN is a greenness band, $NIR_{Orig}$ is an original near infrared band, $G_{Orig}$ is an original green band, $B_{Orig}$ is an original blue band, $\lambda$ is a threshold and s is a scale factor.

7. A method for improving the colour of a natural colour image comprising the steps of generating a greenness band from a multispectral image including blue, green, red and near infrared bands and adjusting the green band using the greenness band, wherein the greenness band is generated using an equation selected from the group comprising equations:

$$GN_H = (NIR_{PS} - G_{PS} - \lambda)/s \text{ and}$$

$$GN_H = (NIR_{PS} - B_{PS} - \lambda)/s,$$

where $GN_H$ is a high resolution greenness band, $NIR_{PS}$ is a pan-sharpened near infrared band, $G_{PS}$ is a pan-sharpened green band, $B_{PS}$ is a pan-sharpened blue band, $\lambda$ is a threshold and s is a scale factor.

8. A method for improving the colour of a natural colour image and pan-sharpened natural colour image comprising the steps of generating a greenness band from a multispectral image including blue, green, red and near infrared bands;

generating a greenness band from a panchromatic image and a pan-sharpened red band; and adjusting the green band and pan-sharpened green band using the greenness band, wherein the greenness band is generated using an equation selected from the group comprising the equations:

$$GN_H = (Pan_{Orig} - G_{PS} - \lambda)/s \text{ and}$$

$$GN_H = (Pan_{Orig} - B_{PS} - \lambda)/s,$$

where $GN_H$ is a high resolution greenness band, $Pan_{Orig}$ is an original panchromatic band, $G_{PS}$ for pan-sharpened green band, $B_{PS}$ for pan-sharpened blue band, $\lambda$ is a threshold and s is a scale factor.

9. The method according to claim 4, wherein the greenness bands are generated using an equation selected from the group comprising:

$$GN_H = (Pan_{Orig} - G_{PS\ -\lambda})/s \text{ and}$$

$$GN_H = (Pan_{Orig} - B_{PS\ -\lambda})/s,$$

where $GN_H$ is a high resolution greenness band, $Pan_{Orig}$ is an original panchromatic band, $G_{PS}$ for pan-sharpened green band, $B_{PS}$ for pan-sharpened blue band, $\lambda$ is a threshold and s is a scale factor.

* * * * *